United States Patent [19]

Harmon, Jr. et al.

[11] 4,220,297
[45] Sep. 2, 1980

[54] FINLET INJECTOR

[75] Inventors: Darell B. Harmon, Jr., Huntsville, Ala.; Arnold W. Foss, Santa Monica, Calif.

[73] Assignee: The United States of America as represented by the Secretary of the Army, Washington, D.C.

[21] Appl. No.: 971,459

[22] Filed: Dec. 20, 1978

[51] Int. Cl.³ .............................................. B64C 21/08
[52] U.S. Cl. ................................... 244/3.21; 244/3.22; 244/117 A
[58] Field of Search ...................... 244/3.21, 3.22, 130, 244/117 A, 207

[56] References Cited

U.S. PATENT DOCUMENTS

| 3,682,100 | 8/1972 | Lundberg, Jr. | 102/105 |
| 3,745,928 | 7/1973 | Kinnaird et al. | 102/105 |
| 3,770,226 | 11/1973 | Kranz | 244/3.21 |
| 4,151,800 | 5/1979 | Dotts et al. | 102/105 |

OTHER PUBLICATIONS

Asymmetric "Penshape" Nozzles in Jet Carnard Configurations for Attitude Control by Robert W. Cubbison NASA Tech. Note D 1561.

Primary Examiner—Harold J. Tudor
Attorney, Agent, or Firm—William G. Gapcynski; Werten F. W. Bellamy; James T. Deaton

[57] ABSTRACT

A finlet injector for external burning fuel injection is provided to obtain a higher performance through a combination of more optimum air-to-fuel ratio and better air/fuel mixing. This is done by capturing (mixing with) a greater quantity of air for a given fuel injection pressure and flow rate. The device is thermally protected and for most flight regimes has minimum drag.

4 Claims, 6 Drawing Figures

FINLET INJECTOR

DEDICATORY CLAUSE

The invention described herein may be manufactured and used by or for the Government for governmental purposes without the payment of any royalties thereon.

CROSS REFERENCE TO RELATED ART

This application is related to the system disclosed in U.S. Pat. No. 3,926,390 issued Dec. 16, 1975 to Ronald F. Teuber et al in that the finlet injector of this invention is used on the surface of a missile of such a system.

BACKGROUND OF THE INVENTION

In the past, mechanical "pop-up" injectors have been used for injection purposes. However, these devices have not had the simplicity or the injection capabilities that is now required.

Therefore, it is an object of this invention to provide a finlet injector that has faster response due to minimum dribble volume.

Another object of this invention is to provide a finlet injector that has no required mechanical action other than simple valve operation.

Still another object of this invention is to provide a finlet injector that has extremely short activation time after flow turn-on.

Still another object of this invention is to provide a finlet injector in which the complexity is less than mechanical injector alternatives such as "pop-up" injectors.

Still a further object of this invention is to provide a finlet injector that permits optimization of orifice location, size, and direction of injection.

Still another object of this invention is to provide a finlet injector that is thermally protectable.

Other objects and advantages of this invention will be obvious to those skilled in this art.

SUMMARY OF THE INVENTION

In accordance with this invention, a finlet injector is provided that includes a body that is adapted to be mounted on the side of a missile in a conventional manner and the body being of a streamlined structure and having insulating means on exposed surfaces thereof for protecting the internal structure of the injector and the injector having a central flow passage with a plurality of orifices through which fluid can be injected while a missile is in flight.

DESCRIPTION OF THE PREFERRED EMBODIMENT

Figure 2:
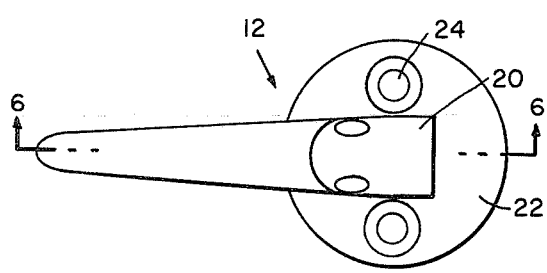
FIG. 2 is a top plan view of the finlet injector in accordance with this invention.
Figure 1:
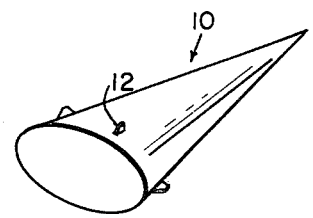
FIG. 1 is a perspective view of a missile schematically illustrating the finlet injector about the periphery thereof.
Figure 3:
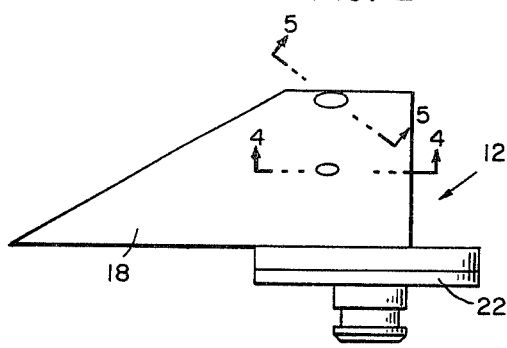
FIG. 3 is a side plan view of the finlet injector in accordance with this invention.
Figure 4:
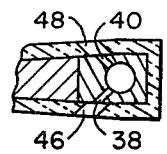
FIG. 4 is a sectional view taken along line 4—4 of FIG 3.
Figure 5:
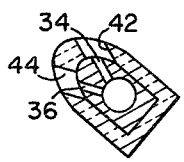
FIG. 5 is a sectional view taken along line 5—5 of FIG. 3.
Figure 6:
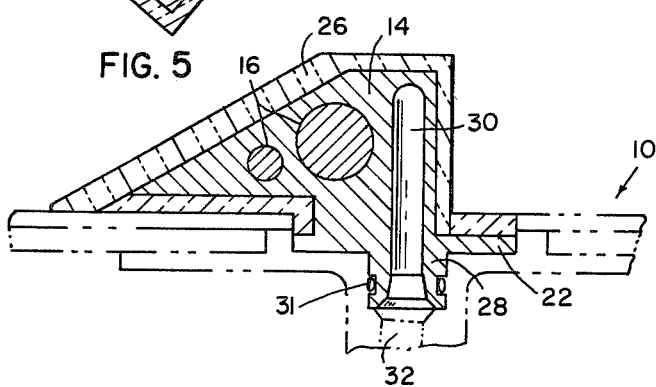
FIG. 6 is a sectional view of the finlet injector taken along line 6—6 of FIG. 2 and illustrating a portion of the missile body structure in phantom.

Referring now to the drawing, a missile 10 is illustrated in FIG. 1 that has finlet injectors 12 mounted thereon as schematically illustrated. Referring now to FIGS. 2-6 for the detail structure of finlet injector 12, the finlet injector includes an inner metallic housing structure 14 that has a higher heat absorbing material 16 as a heat sink means mounted therein for absorbing excess heat that would be created when the finlet injector is being moved rapidly through the atmosphere by missile 10. Housing structure 14 has a front tapered and streamlined portion 18 that tapers back to a generally rectangular rear portion 20. Rear portion 20 has an integral base 22 for securing the finlet injector to a missile body structure in a conventional manner such as by securing means 24. Body structure 14 has an insulating cap 26 thereabout as illustrated. This cap is designed to protect inner core structure 14 and the fluid to be injected from aerodynamic heating. Body structure 14 has a nipple type inlet connector 28 that receives an O-ring 30 (see FIG. 6) to seal the inlet injector relative to the flow passage within the missile housing that provides fluid to the finlet injector. Body structure 14 has an inlet passage 32 that communicates fluid from passage 32 of the missile to injector ports 34 and 36 as illustrated in FIG. 5 and injector ports 38 and 40 as illustrated in FIG. 4. As illustrated, one can see that passages 34, 36, 38 and 40 are at an angle to each other to provide and optimize fuel distribution from the finlet injector. Insulation 26 has openings 42 and 44 that are larger than ports 34 and 36 and openings 46 and 48 that are larger than ports 38 and 40. Insulation 26 is cut back to allow the larger openings 42, 44, 46, and 48 to prevent the exiting fluid from impinging on the insulation. Insulation 26 is provided for the protection of the fluid from heating to prevent boiling (with attendant two-phase flow) and decomposition.

In operation, fluid from a source within missile 10 enters the finlet injector through passage 32 in missile housing 10 to passage 30 of the finlet injector and exits through orifices 34, 36, 38, and 40. The insulation surrounding the orifices is cutback sufficient to allow a larger diameter so that the exiting fluid is prevented from impinging upon it. The fluid injected is or can be external burning control type fuel injection.

With applicants' device, fuel distribution is optimized for rapid and efficient combustion (optimum orifice size, location, and direction), provided with thermal protection, provides a device that is relatively simple (compared with mechanical alternate) to manufacture and design, and applicants' device can be used to provide optimum vehicle stability pattern by shaping and sizing thickness and plan form.

We claim:

1. A finlet injector for mounting on a missile structure, said finlet injector including a body portion with a front end streamlined portion, heat insulating means mounted on external surfaces of said body portion, passage means in said finlet injector for injecting fluid into the atmosphere about said finlet injector, said passage means including an inlet passage in said body portion that communicates with a plurality of outlet injector passages that inject the fluid to the atmosphere, said heat insulating means having a larger opening therein at each of said outlet injector passages to prevent fluid injected from said outlet passages from impinging on said heat insulating means, and said body portion having means for mounting said finlet injector on the side of a missile.

2. A finlet injector as set forth in claim 1, wherein said streamlined portion includes a tapered portion that tapers outwardly from the front end and wherein said streamlined portion is curved in a direction which is perpendicular to said tapered portion.

3. A finlet injector as set forth in claim 2, wherein said plurality of outlet injector passages are four and wherein a first two of said passages inject fluid out opposite sides of said finlet injector and wherein the other two of said passages inject fluid out the sides of said finlet injector at an acute angle relative to said first two of said passages.

4. A finlet injector as set forth in claim 3, wherein said body portion has heat sink means therein and said heat sink means being located in front of said passage means in said finlet injector.

* * * * *